(12) United States Patent
Menhart

(10) Patent No.: US 7,973,436 B2
(45) Date of Patent: Jul. 5, 2011

(54) ELECTRIC LINEAR MOTOR

(75) Inventor: Michael Menhart, Igling (DE)

(73) Assignee: Siemens Aktiengedellschaft, München (DE)

( * ) Notice: Subject to any disclaimer, the term of this patent is extended or adjusted under 35 U.S.C. 154(b) by 0 days.

(21) Appl. No.: 12/599,004

(22) PCT Filed: May 7, 2008

(86) PCT No.: PCT/EP2008/055595
§ 371 (c)(1),
(2), (4) Date: Nov. 5, 2009

(87) PCT Pub. No.: WO2008/138819
PCT Pub. Date: Nov. 20, 2008

(65) Prior Publication Data
US 2010/0141054 A1    Jun. 10, 2010

(30) Foreign Application Priority Data
May 9, 2007    (DE) .......................... 10 2007 021 722

(51) Int. Cl.
*H02K 41/02* (2006.01)
*H02K 41/00* (2006.01)

(52) U.S. Cl. ............... 310/12.22; 310/12.01; 310/12.02; 310/12.21; 310/12.26; 310/13

(58) Field of Classification Search ............... 310/12.22, 310/13, 14, 12.01, 12.02, 12.21, 12.26
See application file for complete search history.

(56) References Cited

U.S. PATENT DOCUMENTS

| | | | |
|---|---|---|---|
| 3,602,745 A | | 8/1971 | Davis |
| 4,217,567 A | * | 8/1980 | Roy et al. ....................... 335/255 |
| 6,329,728 B1 | * | 12/2001 | Kitazawa et al. ............... 310/14 |
| 2005/0006959 A1 | * | 1/2005 | Hoppe et al. .................... 310/12 |

FOREIGN PATENT DOCUMENTS

| | | | |
|---|---|---|---|
| EP | 1 378 319 A1 | | 1/2004 |
| JP | 57101557 A | * | 6/1982 |
| JP | 11225468 A | | 8/1999 |
| JP | 11332211 A | | 11/1999 |

* cited by examiner

*Primary Examiner* — Quyen Leung
*Assistant Examiner* — Jose A Gonzalez Quinones
(74) *Attorney, Agent, or Firm* — Henry M. Feiereisen; Ursula B. Day

(57) ABSTRACT

In the field of electrical linear motors, it is known to make more than one laminate core (20) having teeth (22), wherein grooves (24) are designed between the teeth (22). Until now, coils assigned to the laminate core are arranged on each laminate core. The invention is based on this background. Instead, each coil (18) is arranged with a first section in a groove (24) of a first laminate core (20*a*) and with a second section in a groove (24) of a second laminate core (20*b*). The coils are consequently wound in an entirely different direction and now lie in a plane perpendicular to the direction of movement of the secondary part of the electrical linear motor.

5 Claims, 1 Drawing Sheet

US 7,973,436 B2

ELECTRIC LINEAR MOTOR

CROSS-REFERENCES TO RELATED APPLICATIONS

This application is the U.S. National Stage of International Application No. PCT/EP2008/055595, filed May 7, 2008, which designated the United States and has been published as International Publication No. WO 2008/138819 and which claims the priority of German Patent Application, Serial No. 10 2007 021 722.8, filed May 9, 2007, pursuant to 35 U.S.C. 119(a)-(d).

BACKGROUND OF THE INVENTION

The invention relates to an electric linear motor having a primary part in relation to which a secondary part of the electric linear motor moves in a predetermined direction. The primary part should comprise a plurality of laminated cores with teeth, with slots being formed between said teeth. The slots serve to accommodate coils.

It is advantageous to select the number of laminated cores of electric linear motors to be high. In the case of the so-called double-comb arrangement, two laminated cores are provided. In the case of a so-called polygonal motor, a polygon is defined and the number of laminated cores provided is equal to the number of corners of the polygon.

Each laminated core conventionally has its own associated coils which are not directly operatively related to the other laminated cores. The coils are usually wound around the teeth. This means that a section of the coil is arranged in a first slot of the laminated core, and another section of the coil is arranged in a second slot of the same laminated core, specifically on the other side of the tooth. In the end region of the rectilinear slots, the coil sections arranged in the respective slots are connected by means of a coil section which is arranged in the air. This coil section which is arranged in the air can also be called a winding head. The winding heads do not contribute to the manner of operation of the coils, but rather are the cause of power losses. The greater the number of laminated cores arranged in an electric linear motor, the more the winding heads of different laminated cores can get in the way of and obstruct one another.

SUMMARY OF THE INVENTION

The object of the invention is to develop an electric linear motor to the effect that the coils can be easily constructed and are arranged in an optimum manner, and therefore the power density is as high as possible and at the same time as little power as possible is lost.

The object is achieved in that each coil is arranged in a slot of a first laminated core by way of a first section and in a slot of a second laminated core by way of a second section. Each coil preferably extends over all the provided laminated cores in each case in one slot of the respective laminated core.

The invention proceeds from the principle that the coils each have to be associated with exactly one laminated core. Instead, the coils are now designed so as to engage over the laminated core. The resulting different orientation of the coil does not influence the manner of electrical operation because the coil sections in the slots in each case contribute to this, and these are not provided any differently than in the prior art. Since each coil runs through slots of each laminated core, it is no longer possible for coils from different laminated cores to get in the way of one another by way of their winding heads, as in the prior art. The greater the number of laminated cores provided, the smaller are the air clearances which the coils between the slots of the laminated cores have to overcome, and the lower the power losses.

If a vector arrow is defined for the predetermined direction of movement of the secondary part of the electric linear motor, in the prior art, each coil is arranged partly in front of the vector arrow and partly behind the vector arrow, as seen in the direction of movement. However, in the case of the invention, the coils are preferably arranged so as to be tilted through 90°, and therefore said coils are wound in a plane which runs perpendicular to the predetermined direction, that is to say around the vector arrow.

The coils therefore surround the secondary part. In other words, the secondary part runs through the coil interior as it moves in the predetermined direction.

Since the invention proceeds from the situation of the coils being wound around a tooth of a laminated core, the coils no longer have to be attached to the laminated core at all. The coils can be produced either from a sufficiently stable material, in order to be self-supporting, or, according to a preferred alternative, be wound onto a coil former which is provided specifically for this purpose. The laminated cores can then be placed onto the coil former with the coils. This embodiment is particularly stable.

For reasons of effective electrical insulation, the coil former is composed of plastic and is preferably injection-molded for the purpose of suitable shaping. The coils can be wound from shaped wire, so that a particularly stable arrangement of the winding results and high filling factors are possible.

The provision of a coil former having the features as claimed in patent claim 6 also forms part of the invention. Accordingly, the coil former for an electric linear motor has a central rectilinear passage for a secondary part of the electric linear motor, and a plurality of means for holding in each case one or more coils, wherein the holding means are arranged in such a way that a coil which is wound onto said holding means completely surrounds the passage.

The coil former can have a suitable attachment means for laminated cores, in order to allow laminated cores to be attached to it.

Two alternative embodiments can be implemented in the case of the coil former which is preferably injection-molded from plastic:

Firstly, the passage can be provided by a closed sleeve. This ensures particularly good separation of the secondary part from the laminated cores.

However, on the exact contrary, it may also be desirable for the laminated cores to be guided as close to the secondary part as possible. In this case, the passage can be provided by a sleeve with openings. In this case, it should be possible to place a laminated core with teeth onto the coil former in such a way that the teeth enter the openings (and preferably pass through said openings in order to reach the interior of the passage).

BRIEF DESCRIPTION OF THE DRAWING

Preferred embodiments of the invention are described in greater detail below with reference to the drawing, in which.

DATAILED DESCRIPTION OF PREFERRED EMBODIMENTS

Figure 1:
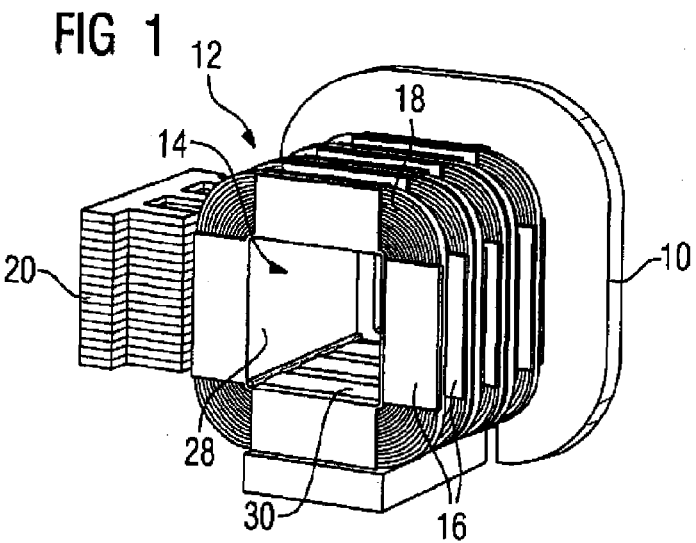
FIG. 1 shows a perspective view of the stator of an electric linear motor according to the invention before a laminated core is mounted, illustrated as seen from the front.

A coil former, denoted as a whole by 12, is attached to a carrier frame 10 for a primary part of an electric linear motor. The coil former 12 comprises an existing rectangular pipe 14, from which a series of insulating separating means 16 protrude in a perpendicular manner from all the sides of the rectangle. The pipe 14 serves as a passage for a secondary part of the electric linear motor which is preferably also designed to be square. The insulating separating means 16 each laterally bound a space in which a section of a coil 18 can be held. The coils 18 are wound such that they surround the pipe 14. The coil wire runs through the space between two of the insulating separating means 16 on a first side of the rectangle, then runs through a free section in the air, then runs through the space between two insulating separating means 16 on a second side of the rectangle, runs through the air once again, runs through the space between two insulating separating means 16 on a third side of the rectangle, runs through the air once again, runs through the space between two insulating separating means 16 on a fourth side of the rectangle, runs through the air once again, and finally returns to the space between the two insulating separating means 16 on the first side of the rectangle. The coil wire is wound several times such that it runs between these insulating separating means 16 on the different sides of the rectangle.

Figure 2:
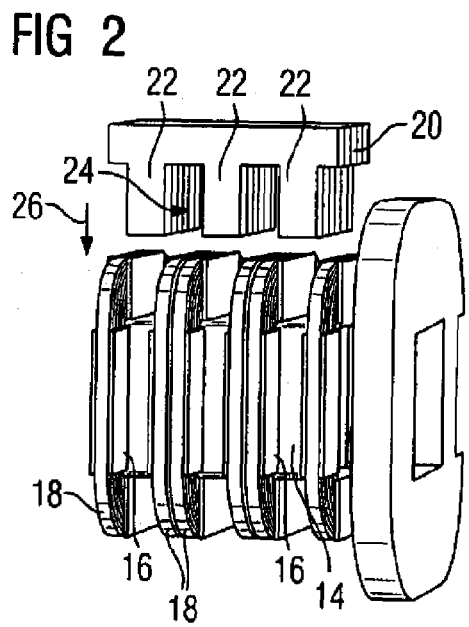
FIG. 2 shows a perspective view of the stator of an electric linear motor according to the invention before a laminated core is mounted, illustrated as seen from the side.
Figure 3:
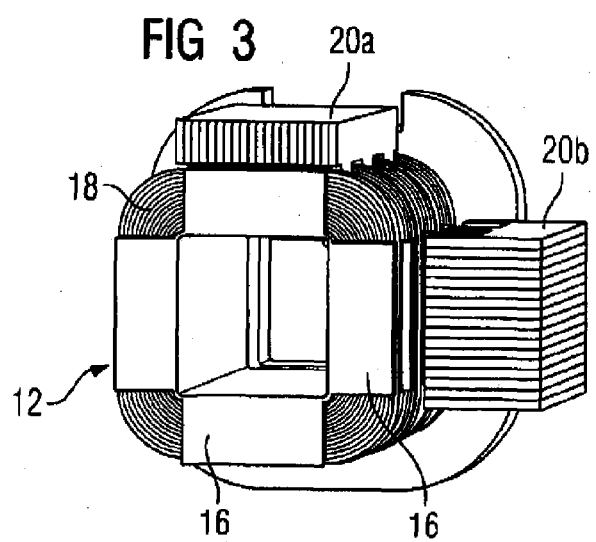
FIG. 3 shows an illustration, which corresponds to FIG. 1, of a stator which is used in the invention and has a pre-attached laminated core and a second laminated core which is still to be attached.

The rectangular shape, which is preferably even perfectly square, defines an electric linear motor which can accommodate four laminated cores. FIG. 1 and FIG. 2 each illustrate a laminated core 20, and FIG. 3 illustrates two laminated cores 20a and 20b. Each laminated core has a plurality of teeth 22. Instead of winding the coils around the teeth as in the past, the coils 18 are now arranged such that they are each arranged in a slot 24 between a pair of teeth 22 by way of one of their sections, but not in a second slot 24 of the same laminated core 20. Instead, the coils extend such that they are then arranged in a slot of the next laminated core, of the next-but-one laminated core and also of the fourth laminated core. Since the coil former 12 is provided, the coils are no longer attached to the laminated cores 20 themselves at all. Instead, the laminated cores 20 are conversely attached to the coil former 12 or to the coils 18. As shown in FIG. 2, said laminated cores can be fitted in accordance with the direction of arrow 26. FIG. 3 shows a fitted laminated core 20a, whereas the laminated core 20b is still to be fitted.

FIG. 1 shows two different alternatives which can be implemented in the coil former 12: a side wall 28 of the pipe 14 is of closed design. The teeth 22 of the laminated cores 20 therefore do not enter the interior of the passage. In contrast, a wall 30 of the pipe 14 has openings. When the laminated core 20 is fitted, the teeth 22 of the laminated core 20 can exactly enter these openings. Therefore, the teeth 22 reach the passage, as a result of which the air gap between the teeth and the secondary part (not shown in the figures) can be made particularly small.

FIG. 3 shows the embodiment of the coil former 12 in which all the walls are closed. Conversely, it is feasible to provide all the walls of the coil former with openings in the manner of the wall 30.

What is claimed is:

1. An electric linear motor, comprising:
   a primary part having a coil arrangement comprising a coil former and a plurality of spaced-apart coils arranged on the coil former, and at least two laminated cores with teeth to define slots there between; and
   a secondary part movable in relation to the primary part in a predetermined longitudinal direction;
   wherein the coil former has a sleeve with sidewalls defining a central rectilinear passage for the secondary part, said sleeve having openings disposed in at least one sidewall, and
   wherein the teeth of the at least two laminated cores are disposed in spaces between adjacent coils; and
   wherein at least one of the laminated cores is constructed for placement onto the coil former in such a way that teeth of the at least one laminated core enter the openings in the at least one sidewall.

2. The electric linear motor of claim 1, wherein each of the coils is wound in a plane oriented in a perpendicular relationship to the predetermined longitudinal direction.

3. The electric linear motor of claim 1, wherein the coil former is made of injection-molded plastic.

4. The electric linear motor of claim 1, wherein the coils are wound from shaped wire.

5. The electric linear motor of claim 1, wherein the coil former comprises holding means for holding one or two of the coils, wherein the holding means are arranged in such a way that a coil which is wound onto the holding means surrounds the passage.

* * * * *

UNITED STATES PATENT AND TRADEMARK OFFICE
CERTIFICATE OF CORRECTION

| | | |
|---|---|---|
| PATENT NO. | : 7,973,436 B2 | Page 1 of 1 |
| APPLICATION NO. | : 12/599004 | |
| DATED | : July 5, 2011 | |
| INVENTOR(S) | : Michael Menhart | |

It is certified that error appears in the above-identified patent and that said Letters Patent is hereby corrected as shown below:

Title Pg,
Item [73] Assignee: replace "Siemens Aktiengedellschaft" with the correct
--Siemens Aktiengesellschaft--.

Signed and Sealed this
Eighteenth Day of October, 2011

David J. Kappos
*Director of the United States Patent and Trademark Office*